United States Patent [19]

Toosky et al.

[11] Patent Number: 6,007,287
[45] Date of Patent: Dec. 28, 1999

[54] DEFORMABLE HEAD FASTENER

[75] Inventors: Rahmatollah F. Toosky, Laguna Niguel; Foad Towfig, Oceanside, both of Calif.

[73] Assignee: McDonnell Douglas Corporation, Huntington Beach, Calif.

[21] Appl. No.: 08/960,982

[22] Filed: Oct. 30, 1997

[51] Int. Cl.$^6$ .................................................. F16B 19/06
[52] U.S. Cl. ............................................ 411/504; 411/506
[58] Field of Search .................................. 411/504, 505, 411/506, 507, 500, 501

[56] References Cited

U.S. PATENT DOCUMENTS

| | | | |
|---|---|---|---|
| 1,443,532 | 1/1923 | Gray | 72/479 |
| 3,391,449 | 7/1968 | Briles | 411/501 |
| 3,526,032 | 9/1970 | Pipher | 29/509 |
| 3,561,102 | 2/1971 | Diemer | 411/507 |
| 3,874,070 | 4/1975 | Falcioni | 29/526 |
| 3,962,775 | 6/1976 | King, Jr. | 411/386 |
| 4,004,484 | 1/1977 | Speakman | 411/507 |
| 4,425,067 | 1/1984 | Krezak | 411/500 |
| 4,630,463 | 12/1986 | Knowlton | 411/507 |
| 4,695,213 | 9/1987 | Sparling et al. | 411/506 |
| 4,712,958 | 12/1987 | Sparling et al. | 411/506 |
| 5,082,411 | 1/1992 | Auriol et al. | 411/506 |
| 5,129,771 | 7/1992 | Briles | 411/507 |
| 5,273,386 | 12/1993 | Luhm | 411/507 |
| 5,332,349 | 7/1994 | Gerwin | 411/507 |
| 5,580,202 | 12/1996 | Luhm | 411/507 |

FOREIGN PATENT DOCUMENTS

| | | | |
|---|---|---|---|
| 0517709 | 6/1976 | U.S.S.R. | 411/501 |
| 0562677 | 6/1977 | U.S.S.R. | 411/501 |
| 0516848 | 7/1977 | U.S.S.R. | 411/504 |
| 0593011 | 2/1978 | U.S.S.R. | 411/500 |
| 0661168 | 5/1979 | U.S.S.R. | 411/504 |

OTHER PUBLICATIONS

"Rivets", Catalog #50, John Hassall, Inc., Brooklyn, NY, 1946.

"The Real Strength of Rivets", Advancing Fastener Application Engineering, Winter, 1962/63.

*Primary Examiner*—Flemming Saether
*Attorney, Agent, or Firm*—Senniger, Powers, Leavitt & Roedel

[57] ABSTRACT

A fastener for use in connecting first and second structural members together. The first and second members have aligned bores defining a fastener receiving hole including a countersink portion extending from an outer surface of the first member and a through portion extending from an inner end of the countersink portion to an inner surface of the first member. The through portion has a mouth at its intersection with the countersink portion. The fastener comprises a head having a shape which is different than the shape of the countersink portion when the head is in an undeformed condition. A shank extends from the head and is dimensioned to be received through the through portion of the fastener receiving hole and to extend outwardly from the bore of the second member when the head is in contact with the first member in the countersink portion. The head is constructed for plastic deformation upon force being applied thereto such that substantial cold working of the material of the head occurs at the mouth of the through portion and the head assumes a shape complementary to that of the countersink portion to provide a uniform fill of the countersink and through portions of the bore of the first member.

9 Claims, 3 Drawing Sheets

DEFORMABLE HEAD FASTENER

BACKGROUND OF THE INVENTION

This invention relates to fasteners for connecting adjacent structural members and, more particularly, to a rivet having a deformable head for providing uniform fill of rivet holes in the structural members.

Rivets are used in various industries as an inexpensive fastener. The rivets generally include a head and a shank which are inserted into aligned holes of adjacent structural members and deformed to permanently join the structures. In the aerospace industry rivets are used in many applications, such as attaching aircraft skin to wing structure. Riveted structures are often selected for their ease of installation and enhancing fatigue characteristics of the structure. These characteristics, however, are dependent on the hole-filling capability of the rivet. Rivets presently available do not provide both sufficient radial enlargement of the head, and deformation and expansion of the head toward a head to shank junction. This prevents the formation of compressive residual stress in the surrounding structure required to provide a satisfactory fatigue life of the structural joint.

Conventional rivets have a preformed head to conform to the shape of the bore in the structure, thus little cold working of the head takes places during installation of the rivet. The preformed head prevents expansion of the rivet at the head to shank junction which results in lack of hole fill in this critical area. Improper hole fill may result in relative movement between structural components which may initiate fatigue cracks. Furthermore, if adequate hole fill is not achieved, fluids and sealants can enter gaps between the rivet and structure and may get entrapped and cause corrosion and weakening of the joint.

A prior art rivet R is shown in FIG. 1 inserted into two structural members M prior to upsetting of the rivet. The rivet has a head H which generally conforms to the shape of a countersink C in the structural member. During upsetting of the rivet R, the head H is only slightly deformed and undergoes a small amount of radial expansion to fill the countersink C. Since the head H has previously been formed to its near final shape, the preformed head inhibits expansion of the rivet R in a head to shank junction J.

Moreover, the rivet shown in FIG. 1 must be precisely sized to provide sufficient volume to adequately fill the countersink without protruding beyond the surface of the structure. The rivet head must be as flush as possible for aerodynamic surfaces of high performance aircraft since surface irregularity can degrade performance due to aerodynamic drag. If the volume of the head is smaller than the countersink, the rivet will not adequately fill the opening and leave gaps between the rivet and structure, if the volume of the head is greater than the countersink, the rivet will extend beyond the surface of the structure. The structure or rivet will then have to be machined to provide a flush surface. This extra machining step is time consuming and increases the manufacturing costs of the structure and aircraft.

In order to eliminate this final machining, precision drilled structures and precision machined rivets have been developed. This significantly increases the cost of the rivet and machining of the structure. These close tolerance requirements also result in a high rejection rate of the structural joint.

SUMMARY OF THE INVENTION

The present invention overcomes the deficiencies of the prior art by providing a fastener in which the head is substantially deformed during installation, thus enabling cold working of the head to completely fill fastener receiving holes in the structure. The fastener expands uniformly throughout the holes to provide proper hole fill which extends the fatigue life of the fastener and the surrounding structure. The deformation of the head provides intimate engagement of the fastener with the bore and countersink, thus providing a fluid tight seal to minimize entry of liquid and sealant into the holes which may cause corrosion of the fastener and structure. Among the features of the present invention may be noted the provision of a fastener which is economical to manufacture, easy to install and reliable. Furthermore, the fastener can be installed in structure in which the dimensions of the holes in the structure are not critically controlled, thus reducing the machining costs of the structure and rejection rates of the fasteners.

Generally, a fastener of the present invention is for use in connecting first and second structural members together. The first and second members have aligned bores defining a fastener receiving hole including a countersink portion extending inwardly from an outer surface of the first member and a through portion extending from an inner end of the countersink portion to an inner surface of the first member. The through portion has a mouth at its intersection with the inner end of the countersink portion. The fastener is made of a material which is more deformable than the first and second members. The fastener comprises a head having a shape which is different than the shape of the countersink portion when the head is in an undeformed condition. A shank extends from the head and is dimensioned to be received through the through portion of the fastener receiving hole and to extend outwardly from the bore of the second member when the head is in contact with the first member in the countersink portion. The head is constructed for plastic deformation upon force being applied thereto such that substantial cold working of the material of the head occurs at the mouth of the through portion and the head assumes a shape complementary to that of the countersink portion to provide a uniform fill of the countersink and through portions of the fastener receiving hole and substantially continuous engagement between the fastener and the first and second members in the countersink and through portions of the hole, and to create an outer surface of the head which is substantially flush with the outer surface of the first member.

In another aspect of the present invention, a structural joint generally comprises a fastener and first and second members as described above.

A method of the present invention joins first and second structural members with a fastener as described above. The method generally includes inserting the fastener into the bores of the first and second members such that the head contacts the first member in the countersink and a free end of the shank extends from the bore of the first member. The method further includes applying force to the head and the free end of the shank such that substantial cold working of the material of the head occurs at the mouth of the through portion and the head assumes a shape complementary to that of the countersink portion to provide a uniform fill of the countersink and through portions of the fastener receiving hole.

Other objects and features will be in part apparent and in part pointed out hereinafter.

DESCRIPTION OF THE DRAWINGS

Corresponding reference characters indicate corresponding parts throughout the several views of the drawings.

DETAILED DESCRIPTION OF THE INVENTION

Figure 1:
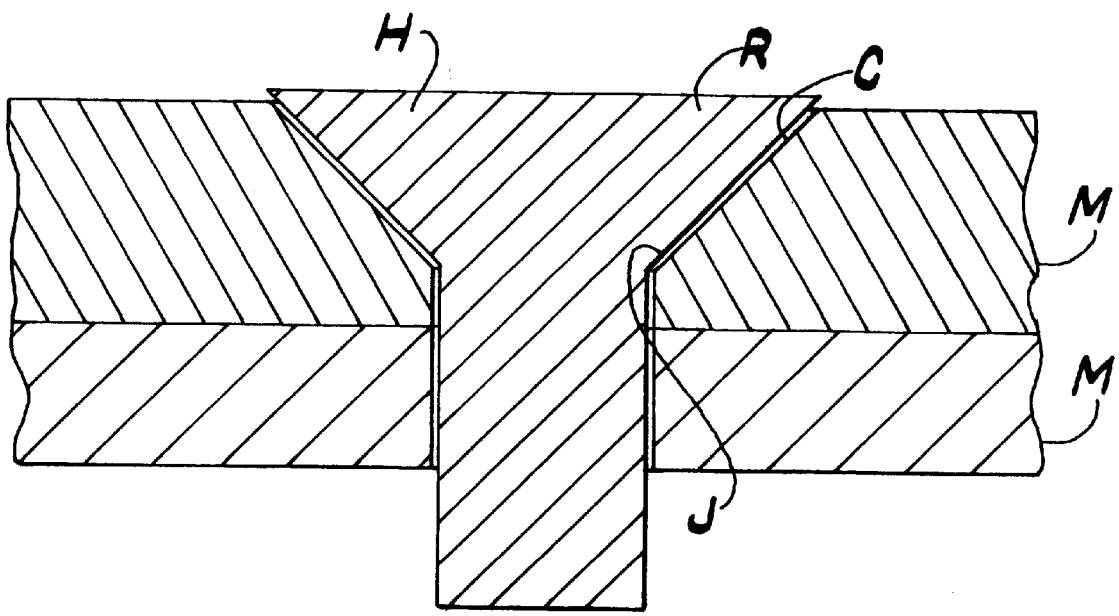
FIG. 1 is a cross-sectional view of a prior art fastener prior to upsetting the fastener.
Figure 2:
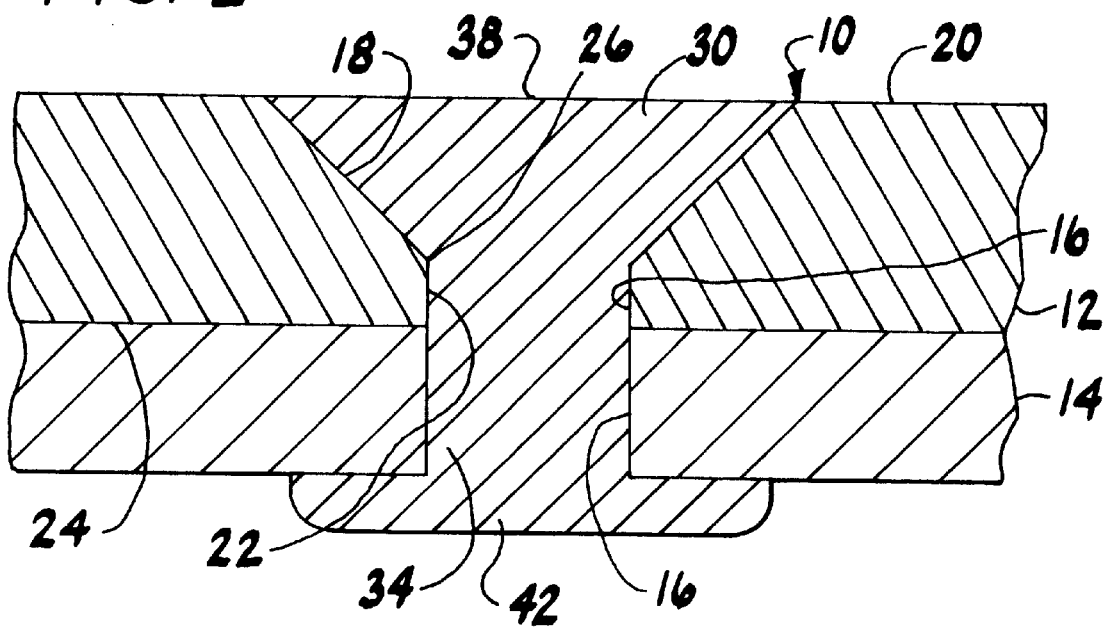
FIG. 2 is a cross-sectional view of a fastener of the present invention connecting two members together.

Referring now to the drawings, and first to FIG. 2, a fastener of the present invention is generally indicated at 10. The fastener, or rivet, 10 is used for connecting structural members together, such as first member 12 and second member 14 shown in FIG. 2, to form a structural joint. The rivet 10 is used, for example, to attach a skin of an aircraft wing to wing frame. The rivet 10 may be used to attach various other structural elements and may also be used to join three or more structural elements together.

Each member 12, 14 has a bore 16 formed therethrough for receiving the rivet. The aligned bores 16 of the first and second members 12, 14 define a fastener receiving hole including a countersink portion 18 extending inwardly from an outer surface 20 of the first member and a through portion 22 extending from an inner end of the countersink portion to an inner surface 24 of the first member. The through portion 22 has a mouth 26 at its intersection with the inner end of the countersink portion 18. The countersink portion 18 is preferably frustoconical in shape but may have configurations other than shown without departing from the scope of the present invention. For example, the countersink may have curvilinear surfaces.

The rivet 10 is made of a material which is more deformable than the first and second members 12, 14 so that it can be easily deformed by a rivet tool (not shown) without deforming the outer surfaces of the members. The rivet 10 may be formed from various materials such as niobium titanium alloy, monel, aluminum, titanium, corrosion resistant steel or any other relatively deformable material.

Figure 3:
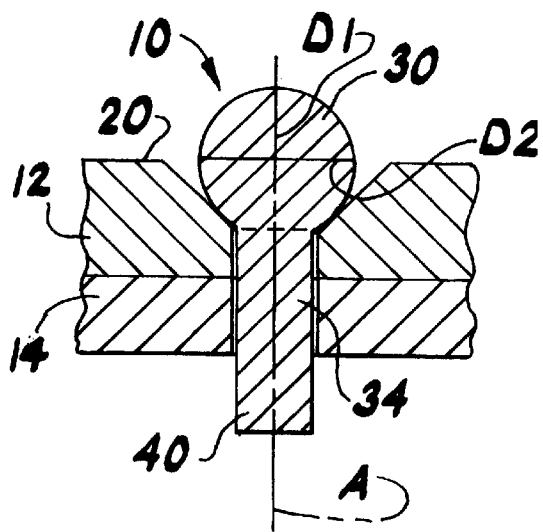
FIG. 3 is a cross-sectional view of the fastener of FIG. 2 prior to upsetting of the fastener.

The rivet 10 comprises a head 30 having a shape which is different than (noncomplementary to) the shape of the countersink portion 18 when the head is in an undeformed condition (FIG. 3). A cylindrical shank 34 extends from the head 30 and is dimensioned to be received through the through portion 22 of the fastener receiving hole when the head is in contact with the first member 12 in the countersink portion 18. The shank 34 is preferably formed as one piece with the head 30. The head 30 is constructed for plastic deformation upon application of force such as by the rivet tool such that substantial cold working of the material of the head occurs at the mouth 26 of the through portion 22 and the head assumes a shape complementary to that of the countersink portion 18 to provide uniform fill of the countersink and through portion of the fastener receiving hole and substantially continuous engagement between the rivet 10 and first member 12 in the countersink and through portions of the bore.

The head 30 comprises a generally spherical portion 40 which extends beyond the outer surface 20 of the first member 12 when the head is received in the countersink portion 18 in its undeformed condition (FIG. 3). The head 30 preferably has a volume which is generally equal to the volume of the countersink portion 18 of the first member 12. The head 30 has a first dimension D1 extending along a longitudinal axis A of the shank 34 and a second dimension D2 extending transversely to the axis. In the embodiment shown in FIG. 3, the first and second dimensions D1, D2 are approximately equal to one another.

When the rivet 10 is installed, the head 30 is flattened and is in complete contact with the first member 12 in the countersink portion 18 (FIG. 2). The head 30 expands radially to fill the countersink portion 18. The bores 16 of the first and second members 12, 14 are slightly expanded and put in residual hoop compression stress. More specifically, when the head 30 is flattened the material is radially expanded in the countersink portion 18 and pushes outwardly against the first member 12 to deform the first member radially outwardly in the countersink portion. This greatly improves the fatigue life of the structural joint. An outer surface 38 of the head 30 becomes substantially flush with the outer surface 20 of the first member 12, upon completion of the rivet deformation, thereby not requiring any after installation shaving for aerodynamic applications. The rivet 10 will expand to provide a tight seal and the head will be in firm engagement and intimately seal with the countersink portion 18. At the mouth 26 of the through portion 22 the compression forces are due to the cold working and flow of the material of the head 30 into the mouth and its corresponding expansion.

The rivet 10 is driven by conventional rivet installation equipment currently used to swage standard flush rivets, as is well known by those skilled in the art. A die of the rivet tool (not shown) is applied to the head 30 and an anvil of the tool is applied to a free end 40 of the shank 34, which is upset to form a portion tightly in engagement with the second member (FIGS. 2 and 3). The free end 40 of the shank 34 is formed by the upsetting operation into a flattened or upset portion 42, which in combination with the head, fixedly and tightly secures the members 12, 14 together. During upsetting of the rivet 10, the deformable nature of the rivet permits deformation or flow of the material of the head 30, whereby the material is forced into intimate engagement with the bores 16 of the members 12, 14. The spherical shape of the head 30 provides uniform deformation and thus requires only a single strike by the tool, rather than several blows as often required with conventional rivets.

The structural joint results in a rigid, tight joint capable of withstanding stress and vibration. The head 30 of the rivet 10, after being driven, is flush with the outer surface 20 of the first member 12 so that no milling or cutting is required to achieve a smooth, flat, continuous surface.

Figure 4:
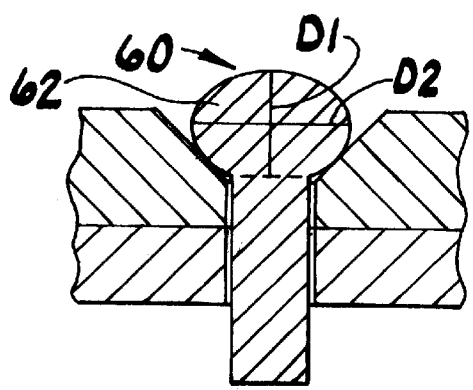
FIG. 4 is a cross-sectional view of a fastener of a second embodiment of the present invention prior to upsetting the fastener.

A second embodiment of the fastener, generally indicated at 60, is shown in FIG. 4 in its undeformed condition. The fastener 60 has a head 62 having a second dimension D2 which is larger than a first dimension D1.

Figure 5:
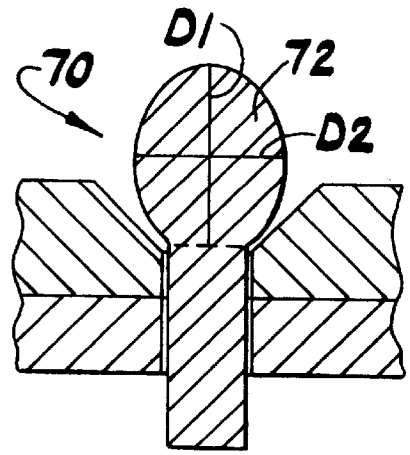
FIG. 5 is a cross-sectional view of a fastener of a third embodiment of the present invention prior to upsetting of the fastener.

FIG. 5 shows a third embodiment of the fastener, generally indicated at 70, in its undeformed condition. The head 72 is generally elliptical in shape having its first dimension D1 larger than the second dimension D2.

Figure 6:
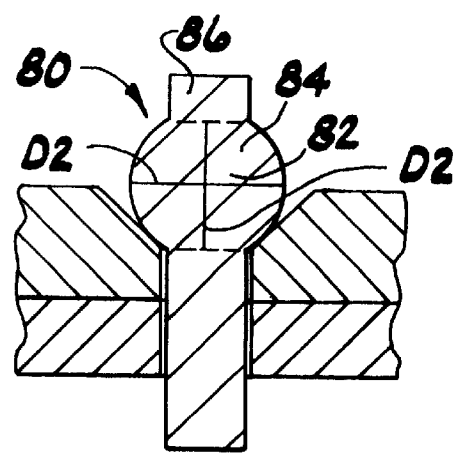
FIG. 6 is a cross-sectional view of a fastener of a fourth embodiment of the present invention prior to upsetting of the fastener.

A fourth embodiment of the fastener, generally indicated at 80, is shown in FIG. 6 in its undeformed condition. The head 82 includes a generally spherical portion 84 and a cylindrical portion 86 contiguous with the spherical portion. The first dimension D1 of the spherical portion 84 is approximately equal to the second dimension D2 of the spherical portion.

It is to be understood that the rivet may have other shapes than shown without departing from the scope of the invention as long as the head does not initially conform to the shape of the countersink portion 18 so that the head is substantially deformed during upsetting and the material undergoes cold working.

Figure 7:
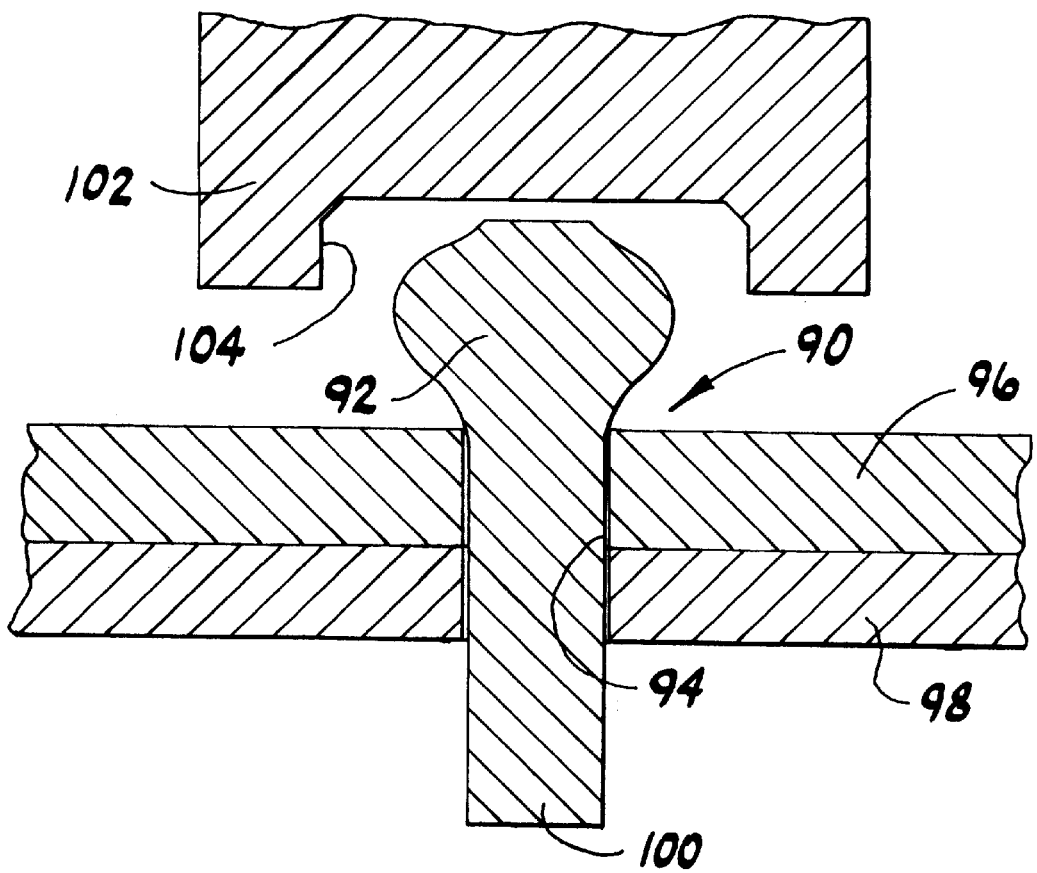
FIG. 7 is a cross-sectional view of a fastener of a fifth embodiment prior to upsetting the fastener.
Figure 8:
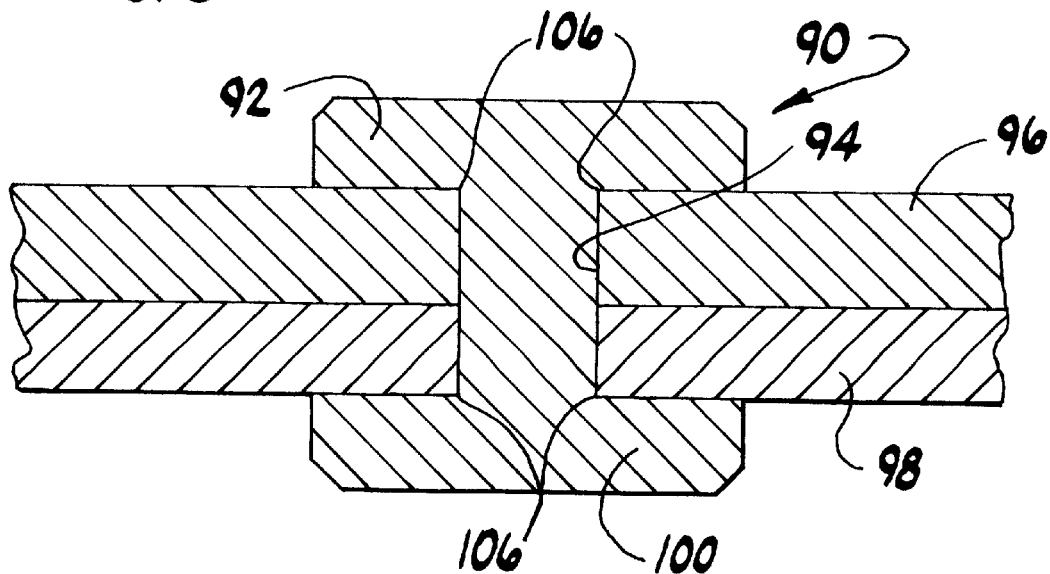
FIG. 8 is a cross-sectional view of the fastener of FIG. 7 connecting two members together.

A fifth embodiment of the fastener, generally indicated at 90, is shown in FIG. 7 in its undeformed condition. The head 92 has a generally curvilinear portion and has a width greater than bores 94 of the first and second members 96, 98. The bores 94 have a generally constant diameter. The fastener 90 is configured so that the head 92 extends outwardly from the first member 96 and a free end of the shank 100 extends from the second member 98. A rivet tool having a die 102 with a cylindrical or polygonal shaped opening 104 is used to apply a force to the head 92 of the fastener while a second die (not shown) of the rivet tool applies a force to the free end of the shank. As shown in FIG. 8, the installed fastener 90 has a head 92 to form a protruding head type installation conforming to the shape of the opening 104 in the die 102, and a free end of the shank 100. The head 92 and end of the shank 100 may have approximately the same width. It is to be understood that the shape of the head and shank in their undeformed condition may be different from one another and different than the shape shown without departing from the scope of the invention. The undeformed head 92 may also have shapes other than shown. This protruding head 92 configuration would similarly fill the hole uniformly and would induce residual compression stresses at corners 106 which would greatly enhance the fatigue life of the structural members 96, 98.

The head 30, 62, 72, 82 is dimensioned such that its volume matches the receiving countersink volume for flush installation and provide adequate deformation of the head for the protruding head installation.

It will be observed from the foregoing that the rivet 10 of this invention has numerous advantages. Importantly, the cold working of the entire head 30, 62, 72, 82 of the rivet 10, 60, 70, 80 substantially enhances the fatigue life of the rivet by the residual interference and stress at the mouth 26 of the through portion 22 (FIGS. 2 and 3). The deformation of the head 30, 62, 72, 82 provides substantial engagement of the head with the countersink portion 18 which provides a positive seal and prevents water or other liquids from passage into the bores 16. In conventional rivets only the upset free end provides a liquid tight seal. The metal to metal seal at both ends of the rivet 10 eliminates the need for polymer sealant in some applications. The rivet 10 provides optimum joint strength and fatigue resistance through controlled rivet deformation to achieve the proper axial clamping force and radial expansion to fill the bores 16.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A fastener for use in connecting first and second structural members together, the first and second members having aligned bores defining a fastener receiving hole including a countersink portion extending inwardly from an outer surface of the first member and a through portion extending from an inner end of the countersink portion to an inner surface of the first member, the through portion having a mouth at its intersection with the inner end of the countersink portion, the fastener comprising:

a head comprising a generally curvilinear portion, the curvilinear portion being generally spherical in shape, the head further including a cylindrical portion contiguous with the curvilinear portion; and a shank extending from the head on a side of the head opposite the cylindrical portion and adapted to be received through the through portion of the fastener receiving hole and to extend outwardly from the bore of the second member when the head is in contact with the first member in the countersink portion.

2. A fastener as set forth in claim 1 wherein the head has a volume substantially the same as the volume of the countersink portion.

3. A fastener as set forth in claim 1 wherein the shank is formed as one piece with the head.

4. A fastener as set forth in claim 1 wherein the fastener is formed from a niobium titanium alloy.

5. A fastener as set forth in claim 1 wherein the fastener is formed from monel.

6. A structural joint comprising:

a fastener; and first and second structural members having aligned bores defining a fastener receiving hole including a countersink portion extending inwardly from an outer surface of the first member and a through portion extending from an inner end of the countersink portion to an inner surface of the first member, the through portion having a mouth at its intersection with the inner end of the countersink portion;

the fastener being made of a material which is more deformable than the first and second members, the fastener comprising a head having a generally curvilinear portion, the curvilinear portion being generally spherical in shape, and a shank extending from the head and adapted to be received through the through portion of the fastener receiving hole and to extend outwardly from the bore of the second member when the head is in contact with the first member in the countersink portion, wherein the head further includes a cylindrical portion contiguous with the curvilinear portion, the cylindrical portion intersecting the curvilinear portion on oppisites sides of the curvilinear portion;

the head being deformed upon force being applied thereto such that substantial cold working of the material of the head occurs at the mouth of the through portion and the head and the shank assume a shape complementary to that of the countersink portion and through portions of the fastener receiving hole to provide a uniform fill of the countersink and through portions of the fastener receiving hole and substantially continuous engagement between the fastener and first member in the countersink and through portions of the bore.

7. A structural joint as set forth in claim 6 wherein the countersink is generally frustoconical in shape.

8. A method of joining first and second structural members together with a fastener, the first and second members having aligned bores defining a fastener receiving hole including a countersink portion extending inwardly from an outer surface of the first member and a through portion extending from an inner end of the countersink portion to an inner surface of the first member, the through portion having a mouth at its intersection with the inner end of the countersink portion, the method comprising the steps of:

inserting the fastener comprising a head having a generally curvilinear portion, the curvilinear portion being generally spherical in shape, and a shank extending from the head into the bores of the first and second members such that the head contacts the first member in the countersink and a free end of the shank extends from the bore of the first member, wherein the head further includes a cylindrical portion contiguous with the curvilinear portion, the cylindrical portion intersecting the curvilinear portion on oppisite sides of the curvilinear portion; and applying force to the head and the free end of the shank such that substantial cold working of the material of the head occurs at the mouth of the through portion and the head assumes a shape complementary to that of the countersink portion to provide a uniform fill of the bores of the fastener receiving hole.

9. A method as set forth in claim 8 wherein the step of applying force to the head and free end of the shank comprises cold working the free end of the shank.

\* \* \* \* \*

UNITED STATES PATENT AND TRADEMARK OFFICE
CERTIFICATE OF CORRECTION

PATENT NO : 6,007,287
DATED : December 28, 1999
INVENTOR(S): Rahmatollah F. Toosky et al.

It is certified that error appears in the above-identified patent and that said Letters Patent are hereby corrected as shown below:

On the front cover of the issued patent, section 75, the inventors name was misspelled as "Foad Towfig" which should read ---Foad Towfiq---.

Signed and Sealed this

Fourteenth Day of November, 2000

*Attest:*

Q. TODD DICKINSON

*Attesting Officer*      *Director of Patents and Trademarks*